United States Patent
Zha et al.

(10) Patent No.: US 11,516,322 B2
(45) Date of Patent: Nov. 29, 2022

(54) DATA TRANSMISSION METHOD AND APPARATUS

(71) Applicant: Huawei Technologies Co., Ltd., Shenzhen (CN)

(72) Inventors: Min Zha, Shenzhen (CN); Xiaojun Zhang, Shenzhen (CN); Zhe Lou, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 16/855,734

(22) Filed: Apr. 22, 2020

(65) Prior Publication Data

US 2020/0252488 A1 Aug. 6, 2020

Related U.S. Application Data

(63) Continuation of application No. PCT/CN2018/111272, filed on Oct. 22, 2018.

(30) Foreign Application Priority Data

Oct. 23, 2017 (CN) .......................... 201710993282.3

(51) Int. Cl.
*H04L 69/324* (2022.01)
*H04L 1/00* (2006.01)
*H04L 69/00* (2022.01)

(52) U.S. Cl.
CPC .......... *H04L 69/324* (2013.01); *H04L 1/0071* (2013.01); *H04L 69/03* (2013.01); *H04L 2212/00* (2013.01)

(58) Field of Classification Search
CPC ..... H04L 69/324; H04L 1/0071; H04L 69/03; H04L 2212/00; H04L 12/2863; H04L 29/06; H04L 69/06; H04L 69/22
(Continued)

(56) References Cited

U.S. PATENT DOCUMENTS 6,347,089 B1 2/2002 Tsui et al.
7,787,502 B1 8/2010 Olsson et al.
(Continued)

FOREIGN PATENT DOCUMENTS

CN 1504034 A 6/2004
CN 1691666 A 11/2005
(Continued)

OTHER PUBLICATIONS

Yamada et al., "Voice Quality Evaluation of IP-Based Voice Stream Multiplexing Schemes," Proceedings LCN 2001. 26th Annual IEEE Conference on Local Computer Networks, pp. 356-364 (2001).
(Continued)

*Primary Examiner* — Candal Elpenord
*Assistant Examiner* — Syed M Bokhari
(74) *Attorney, Agent, or Firm* — Leydig, Voit & Mayer, Ltd.

(57) ABSTRACT

This application provides a data transmission method and apparatus, and relates to the field of communications technologies. The method includes: obtaining a plurality of code block streams; distributing, based on a preset multiplexing sequence, code blocks in the plurality of code block streams by slots, to form a single, interleaved code block stream from the plurality of code block streams; and segmenting and encapsulating the single, interleaved code block stream, to generate at least one frame. By utilizing time division duplexing techniques, a data transmission delay of the code block streams can be reduced.

10 Claims, 7 Drawing Sheets

(58) Field of Classification Search
USPC .................................. 370/474, 476, 389, 329
See application file for complete search history.

(56) References Cited

U.S. PATENT DOCUMENTS

| | | | |
|---|---|---|---|
| 2002/0126685 A1 | 9/2002 | Leatherbury et al. | |
| 2005/0207450 A1 | 9/2005 | Nguyen et al. | |
| 2006/0268939 A1 | 11/2006 | Dries et al. | |
| 2007/0116055 A1* | 5/2007 | Atsumi | H04J 3/1658 370/476 |
| 2007/0165709 A1 | 7/2007 | Walker et al. | |
| 2009/0232133 A1* | 9/2009 | Yu | H04J 3/047 370/389 |
| 2010/0215007 A1* | 8/2010 | Zhang | H04L 5/0007 370/329 |
| 2011/0305458 A1* | 12/2011 | Zhou | H04J 3/1694 398/66 |
| 2012/0251085 A1 | 10/2012 | Cheng et al. | |
| 2015/0288484 A1* | 10/2015 | Nie | H04L 1/0045 714/776 |
| 2017/0005901 A1* | 1/2017 | Gareau | H04L 43/0811 |

FOREIGN PATENT DOCUMENTS

| | | |
|---|---|---|
| CN | 1747606 A | 3/2006 |
| CN | 1917471 A | 2/2007 |
| CN | 101141350 A | 3/2008 |
| CN | 101222290 A | 7/2008 |
| CN | 101237403 A | 8/2008 |
| CN | 101321293 A | 12/2008 |
| CN | 101322415 A | 12/2008 |
| CN | 101399823 A | 4/2009 |
| CN | 102025448 A | 4/2011 |
| CN | 103118143 A | 5/2013 |
| CN | 103885919 A | 6/2014 |
| CN | 106301659 A | 1/2017 |
| CN | 101366262 B | 4/2017 |
| EP | 3468075 A1 | 4/2019 |
| JP | 2003101502 A | 4/2003 |
| JP | 2003188843 A | 7/2003 |
| JP | 2004120503 A | 4/2004 |
| JP | 2007518290 A | 7/2007 |
| WO | 2017016379 A1 | 2/2017 |
| WO | 2019062227 A1 | 4/2019 |

OTHER PUBLICATIONS

Chen Wei-qiang et al., "MPEG-2 system multiplexor of several encoded streams," Journal of Harbin Institute of Technology, vol. 32, No. 2, total 5 pages (Apr. 2000). With English abstract.

* cited by examiner

| [8] | [7:0] |
|---|---|
| 1 | 00 |
| 1 | 01 |
| 1 | 5A |
| 1 | A5 |
| 0 | 00 to FF |

| [8] | [7:0] |
|---|---|
| 1 | 0 |
| 1 | 1 |
| 1 | 2 |
| 1 | 3 |
| 0 | 00 to FF |

| First state | Service data | Service data | Service data | Service data |
|---|---|---|---|---|
| One bit | Eight bits | Eight bits | Eight bits | Eight bits |

| Second state | Second indication identifier | Service data | Control data | Service data | Control data |
|---|---|---|---|---|---|
| One bit | Four bits | Eight bits | Four bits | Eight bits | Eight bits |

DATA TRANSMISSION METHOD AND APPARATUS

CROSS-REFERENCE TO RELATED APPLICATIONS

This application is a continuation of International Application No. PCT/CN2018/111272, filed on Oct. 22, 2018, which claims priority to Chinese Patent Application No. 201710993282.3, filed on Oct. 23, 2017. The disclosures of the aforementioned applications are hereby incorporated by reference in their entireties.

TECHNICAL FIELD

This application relates to the field of communications technologies, and in particular, to a data transmission method and apparatus.

BACKGROUND

In a current Ethernet scenario, a high-speed Ethernet port and a low-speed Ethernet port may be collectively referred to as an Ethernet port, and both the high-speed Ethernet port and the low-speed Ethernet port use an Ethernet for data transmission. The Ethernet is a most frequently used communication protocol standard in a local area network, and may be logically divided into a plurality of layers in the following sequence from top to bottom: a link control layer, a media access control (MAC) layer, and a physical layer. The physical layer may be divided into a physical coding sublayer (PCS), a physical medium attachment (PMA) layer, and a physical media dependent (PMD) layer from top to bottom. The PCS further includes an encoding/decoding layer, a scrambling layer, and the like.

When data is transmitted through an Ethernet egress port, and when a plurality of service data streams are received through the MAC layer, arbitration is performed on the plurality of service data streams, to determine that a specific service data stream is first sent to the physical layer for transmission. For example, a service data stream with a higher priority is first sent, or a service data stream with a small amount of data is first sent.

During a process of implementing this application, the inventors find that there are at least the following problems in the prior art.

Currently, it is determined through arbitration at the MAC layer of the Ethernet egress port that a first service data stream is first sent. In a process of transmitting the first service data stream, a second service data stream is received through the MAC layer, and a priority of the second service data stream is higher than a priority of the first service data stream. However, in this case, there is no extra transmission bandwidth used to transmit the second service data stream. Therefore, the second service data stream can be transmitted only after the first service data stream is transmitted. In this way, if a data volume of the first service data stream is very large, duration of waiting for transmission of the second service data stream is relatively long, thereby causing a relatively long data transmission delay. A service requirement of a service with a relatively high data transmission delay, therefore, cannot be met in an industrial Ethernet.

SUMMARY

To resolve a problem of the prior art, embodiments of the present disclosure provide a data transmission method and apparatus. Technical solutions are as follows:

According to a first aspect, a data transmission method is provided. The method includes:
obtaining a plurality of code block streams;
distributing, based on a preset multiplexing sequence, code blocks in the plurality of code block streams by slots, to form one code block stream; and
segmenting and encapsulating the one code block stream, to generate at least one frame.

In an embodiment of the present disclosure, a preset multiplexing sequence includes a plurality of slots. When a host or a switch has data to be sent through an Ethernet egress port, a plurality of code block streams of the data may be obtained. Then, the plurality of code block streams are distributed by slots, based on the preset multiplexing sequence, to corresponding slots, to obtain one code block stream. The one code block stream is segmented, and the segmented code block streams are encapsulated, to obtain one code block stream. In this way, time division multiplexing is implemented on the plurality of code block streams, and the plurality of code block streams does not affect each other during transmission. This can reduce a data transmission delay.

In a possible implementation, the code blocks in each of the plurality of code block streams are distributed to a corresponding slot based on a correspondence between a slot in the preset multiplexing sequence and a code block stream. Each multiplexing sequence includes N slots, and N is a positive integer.

In an embodiment of the present disclosure, a person skilled in the art may preset the correspondence between a slot in the preset multiplexing sequence and a code block stream. In this way, the correspondence may be directly used to distribute the plurality of code block streams to corresponding slots respectively, to obtain one code block stream.

In a possible implementation, the code blocks in each of the plurality of code block streams are distributed to a corresponding slot based on a correspondence between a slot in the preset multiplexing sequence and an obtaining interface, and based on an obtaining interface of the plurality of code block streams.

In an embodiment of the present disclosure, a person skilled in the art may preset the correspondence between a slot in the multiplexing sequence and the obtaining interface. Each code block stream has an obtaining interface, and the obtaining interface of the code block stream may be used to distribute the code block stream to a corresponding slot, to obtain one code block stream.

In a possible implementation, one service data stream is received; and the one service data stream is encoded in a preset data encoding manner, to obtain any one of the plurality of code block streams.

In an embodiment of the present disclosure, a source of any one of the plurality of code block streams may be: After one service data stream is received, the one service data stream is encoded in a preset data encoding manner, to obtain the one code block stream.

In a possible implementation, at least one service data stream and at least one code block stream are received.

Each service data stream is encoded in the preset data encoding manner, to obtain at least one code block stream.

The at least one code block stream obtained by encoding and the at least one received code block stream are obtained.

In an embodiment of the present disclosure, after the at least one service data stream and the at least one code block stream are received, at least one service data stream may be separately encoded in the preset data encoding manner, to obtain at least one code block stream. Then, the at least one code block stream obtained by encoding and the at least one received code block stream may be obtained. In this way, a code block stream obtaining method is provided.

In a possible implementation, a plurality of service data streams are received.

Each service data stream is encoded in a preset data encoding manner, to obtain a plurality of code block streams.

In an embodiment of the present disclosure, the plurality of service data streams are received, and the plurality of service data streams may be separately encoded in the preset data encoding manner, to obtain the plurality of code block streams. In this way, a code block stream obtaining method is provided.

In a possible implementation, that each service data stream is encoded in the preset data encoding manner includes:

for each service data stream, encoding the service data stream into a code block including four data fields and at least one flag field, and setting a first indication identifier for each code block in a flag field of the code block, where the first indication identifier indicates a first state or a second state, the first state is used to indicate that each of the four data fields of the code block is used for service data, and the second state is used to indicate that at least one of the four data fields in the code block is used for control data; and further set a second indication identifier in a flag field of a code block whose at least one of four data fields is used for control data, where the second indication identifier is used to indicate locations of the service data and the control data in the code block.

In an embodiment of the present disclosure, for each service data stream, the service data stream may be encoded into a code block including four data fields and at least one flag field. If each of the four data fields is used for service data, there is one flag field, the first indication identifier is set in the flag field and indicates the first state. If at least one of the four data fields is used for control data, and at least one of the four data fields is used for control data, there are two flag fields, the first indication identifier is set in the first flag field and indicates the second state, and the second indication identifier is set in the second flag field. In this way, valid bandwidth can be increased in the data encoding manner.

In a possible implementation, the preset data encoding manner is any one of 8B/9B encoding, 64B/66B encoding, and 256B/257B encoding.

In a possible implementation, the method is applied to an Ethernet egress port of a switch.

The plurality of code block streams are obtained from an Ethernet ingress port of the switch.

The code blocks in each of the plurality of obtained code block streams are distributed, based on a correspondence between a slot of an Ethernet egress port and a slot of an Ethernet ingress port in the preset multiplexing sequence, and based on a slot of the Ethernet ingress port of the code blocks in the plurality of code block streams, to a corresponding slot of the Ethernet egress ports, where each multiplexing sequence includes N slots, and N is a positive integer.

In an embodiment of the present disclosure, if the Ethernet egress port of the switch is used, a plurality of code block streams may be obtained from the Ethernet ingress port of the switch. Then the plurality of code block streams are distributed, based on the correspondence between a slot of an Ethernet egress port and a slot of an Ethernet ingress port in the preset multiplexing sequence, to the slots of the Ethernet egress ports, to obtain one code block stream. In this way, the code blocks may be forwarded from the Ethernet ingress port to the Ethernet egress port through interaction in the switch, thereby improving data transmission efficiency.

In a possible implementation, the one code block stream is segmented and encapsulated based on a preset frame length, to generate the at least one frame.

In an embodiment of the present disclosure, the frame length may be preset. Therefore, the one code block stream may be divided into code block streams, and then the code block streams are encapsulated such that a length of the encapsulated frame is equal to the preset frame length. In this way, a length of each frame is identical for ease of distribution.

In a possible implementation, the one code block stream is segmented, and a frame header field is inserted into each segment, to generate the at least one frame; or the one code block stream is segmented, and a frame header field and a frame trailer field are inserted into each segment, to generate the at least one frame.

In an embodiment of the present disclosure, the code block stream may be segmented, and the frame header field and the frame trailer field may be inserted into each segment, or the frame header field may be inserted into each segment, to obtain the at least one frame, which provides an encapsulation manner.

In a possible implementation, a frame format of a frame in the at least one frame is the frame header field, and a first preset quantity of multiplexing sequences, and each multiplexing sequence includes a second preset quantity of slots; or a frame format of a frame in the at least one frame is the frame header field, a first preset quantity of multiplexing sequences, and the frame trailer field, and each multiplexing sequence includes a second preset quantity of slots.

In a possible implementation, the method is applied to an Ethernet egress port.

The one code block stream is segmented, and a frame header field, a destination MAC address, a source MAC address, and an Ethernet type field are inserted into each segment, to generate the at least one frame; or the one code block stream is segmented, and a frame header field, a destination MAC address, a source MAC address, an Ethernet type field, and a frame trailer field are inserted into each segment, to generate the at least one frame.

In an embodiment of the present disclosure, the destination MAC address is any MAC address, the source MAC address is a MAC address of the Ethernet egress port, and the Ethernet type field is used to identify that the frame is an Ethernet type frame. In this way, the encapsulation format does not change.

In a possible implementation, a frame format of a frame in the at least one frame is the frame header field, the destination MAC address, the source MAC address, the Ethernet type field, and a third preset quantity of multiplexing sequences, and each multiplexing sequence includes a fourth preset quantity of slots; or a frame format of a frame in the at least one frame is the frame header field, the destination MAC address, the source MAC address, the Ethernet type field, a third preset quantity of multiplexing sequences, and the frame trailer field, and each multiplexing sequence includes a fourth preset quantity of slots.

In a possible implementation, the frame header field is a preamble, and the frame trailer field is a cyclic redundancy check (CRC) field.

According to a second aspect, a data transmission method is provided, where the method includes:

receiving at least one frame;

decapsulating each of the at least one frame, to obtain one code block stream; and performing demultiplexing for the one code block stream based on a preset multiplexing sequence, to obtain a plurality of code block streams.

In an embodiment of the present disclosure, after a frame is received through an Ethernet ingress port of a switch or a host, the received frame may be decapsulated, to obtain one code block stream. Each code block in the one code block stream is corresponding to a slot. Then, a plurality of code blocks in a slot corresponding to a same encoding stream form a same code block stream based on a correspondence between a slot in the preset multiplexing sequence and a code block stream, and based on a slot corresponding to each code block in the one code block stream. In this way, a plurality of code block streams are obtained.

In a possible implementation, after the plurality of code block streams are obtained, each code block in the plurality of code block streams is decoded in a preset data decoding manner.

In an embodiment of the present disclosure, the preset data decoding manner is corresponding to the data encoding manner in the first aspect.

In a possible implementation, a frame header field and a frame trailer field are deleted from each of the at least one frame, to obtain one code block stream; or a frame header field is deleted from each of the at least one frame, to obtain one code block stream.

In a possible implementation, a frame header field, a destination MAC address, a source MAC address, an Ethernet type field, and a frame trailer field are deleted from each of the at least one frame, to obtain the one code block stream; or a frame header field, a destination MAC address, a source MAC address, and an Ethernet type field are deleted from each of the at least one frame, to obtain the one code block stream.

According to a third aspect, a data transmission apparatus is provided, where the apparatus includes a processor, and the processor is configured to obtain a plurality of code block streams;

the processor is configured to distribute, based on a preset multiplexing sequence, code blocks in the plurality of code block streams by slots, to form one code block stream; and the processor is configured to segment and encapsulate the one code block stream, to generate at least one frame.

In a possible implementation, the processor is configured to:

distribute, based on a correspondence between a slot in the preset multiplexing sequence and a code block stream, the code blocks in each of the plurality of code block streams to a corresponding slot, where each multiplexing sequence includes N slots, and N is a positive integer.

In a possible implementation, the processor is configured to:

distribute, based on a correspondence between a slot in the preset multiplexing sequence and an obtaining interface, and based on an obtaining interface of the plurality of code block streams, the code blocks in each of the plurality of code block streams to a corresponding slot.

In a possible implementation, the processor is configured to:

receive at least one service data stream and at least one code block stream;

encode each service data stream in a preset data encoding manner, to obtain at least one code block stream; and obtain at least one code block stream obtained by encoding and at least one received code block stream.

In a possible implementation, the processor is configured to:

receive a plurality of service data streams; and encode each service data stream in a preset data encoding manner, to obtain a plurality of code block streams.

In a possible implementation, the processor is configured to:

for each service data stream, encode the service data stream into a code block including four data fields and at least one flag field, and set a first indication identifier for each code block in a flag field of the code block, where the first indication identifier indicates a first state or a second state, the first state is used to indicate that each of the four data fields of the code block is used for service data, and the second state is used to indicate that at least one of the four data fields in the code block is used for control data; and further set a second indication identifier in a flag field of a code block whose at least one of four data fields is used for the control data, where the second indication identifier is used to indicate locations of the service data and the control data in the code block.

In a possible implementation, the preset data encoding manner is any one of 8B/9B encoding, 64B/66B encoding, and 256B/257B encoding.

In a possible implementation, the apparatus is applied to an Ethernet egress port of a switch;

the processor is configured to:

obtain the plurality of code block streams from an Ethernet ingress port of the switch; and the processor is configured to: distribute, based on a correspondence between a slot of an Ethernet egress port and a slot of an Ethernet ingress port in the preset multiplexing sequence, and based on a slot of the Ethernet ingress port of the code blocks in the plurality of code block streams, the code blocks in each of the plurality of obtained code block streams to a corresponding slot of the Ethernet egress port, where each multiplexing sequence includes N slots, and N is a positive integer.

In a possible implementation, the processor is configured to:

segment and encapsulate the one code block stream based on a preset frame length, to generate at least one frame.

In a possible implementation, the processor is configured to:

segment the one code block stream, and insert a frame header field into each segment, to generate at least one frame; or segment the one code block stream, and insert a frame header field and a frame trailer field into each segment, to generate at least one frame.

In a possible implementation, a frame format of a frame in the at least one frame is a frame header field, and a first preset quantity of multiplexing sequences, and each multiplexing sequence includes a second preset quantity of slots; or a frame format of a frame in the at least one frame is a frame header field, a first preset quantity of multiplexing sequences, and a frame trailer field, and each multiplexing sequence includes a second preset quantity of slots.

In a possible implementation, the apparatus is applied to an Ethernet egress port; and the processor is configured to:

segment the one code block stream, and insert a frame header field, a destination MAC address, a source MAC address, and an Ethernet type field into each segment, to generate the at least one frame, where the destination MAC address is any MAC address, the source MAC address is a MAC address of the Ethernet egress port, and the Ethernet type field is used to identify that the frame is an Ethernet type frame; or segment the one code block stream, and insert a frame header field, a destination MAC address, a source MAC address, an Ethernet type field, and a frame trailer field into each segment, to generate the at least one frame, where the destination MAC address is any MAC address, the source MAC address is a MAC address of the Ethernet egress port, and the Ethernet type field is used to identify that the frame is an Ethernet type frame.

In a possible implementation, a frame format of a frame in the at least one frame is the frame header field, the destination MAC address, the source MAC address, the Ethernet type field, and a third preset quantity of multiplexing sequences, and each multiplexing sequence includes a fourth preset quantity of slots; or a frame format of a frame in the at least one frame is the frame header field, the destination MAC address, the source MAC address, the Ethernet type field, a third preset quantity of multiplexing sequences, and the frame trailer field, and each multiplexing sequence includes a fourth preset quantity of slots.

In a possible implementation, the frame header field is a preamble, and the frame trailer field is a cyclic redundancy check CRC field.

According to a fourth aspect, a data transmission apparatus is provided, where the apparatus includes a processor, and the processor is configured to receive at least one frame;

the processor is configured to decapsulate each of the at least one frame, to obtain one code block stream; and the processor is configured to perform demultiplexing for the one code block stream based on a preset multiplexing sequence, to obtain a plurality of code block streams.

In a possible implementation, the processor is further configured to:

decode each code block in the plurality of code block streams in a preset data decoding manner.

In a possible implementation, the processor is configured to:

delete a frame header field and a frame trailer field from each of the at least one frame, to obtain the one code block stream; or delete a frame header field from each of the at least one frame, to obtain the one code block stream.

In a possible implementation, the processor is configured to:

delete a frame header field, a destination MAC address, a source MAC address, an Ethernet type field, and a frame trailer field from each of the at least one frame, to obtain the one code block stream, where the destination MAC address is any MAC address, the source MAC address is a MAC address of the Ethernet egress port, and the Ethernet type field is used to identify that the frame is an Ethernet type frame; or delete a frame header field, a destination MAC address, a source MAC address, and an Ethernet type field from each of the at least one frame, to obtain the one code block stream, where the destination MAC address is any MAC address, the source MAC address is a MAC address of the Ethernet egress port, and the Ethernet type field is used to identify that the frame is an Ethernet type frame.

According to a fifth aspect, a data transmission apparatus is provided, where the apparatus includes at least one module, and the at least one module is configured to implement the data transmission method according to the first aspect.

According to a sixth aspect, a data transmission apparatus is provided, where the apparatus includes at least one module, and the at least one module is configured to implement the data transmission method according to the second aspect.

According to a seventh aspect, a computer readable storage medium is provided, where the computer readable storage medium stores an instruction, and when the computer readable storage medium is run on a data transmission apparatus, the apparatus is enabled to perform the data transmission method according to the first aspect and the second aspect.

According to an eighth aspect, a computer program product that includes an instruction is provided. When the instruction is run on a data transmission apparatus, the apparatus is enabled to perform the data transmission method according to the first aspect and the second aspect.

The technical solutions provided in the embodiments of the present disclosure bring the following beneficial effects.

In the embodiments of the present disclosure, the plurality of code block streams are obtained, and the code blocks in the plurality of code block streams are distributed by slots based on a preset multiplexing sequence, to form the one code block stream. The one code block stream is segmented and encapsulated, to generate the at least one frame. In this way, when data is sent through the Ethernet egress port, the plurality of code block streams may be distributed by slots, to implement time division multiplexing. The plurality of code block streams does not affect each other during transmission, and therefore duration of waiting for transmission of the code block stream is reduced, thereby reducing a data transmission delay. This can meet a service requirement of a service with a relatively high data transmission delay in an industrial Ethernet.

BRIEF DESCRIPTION OF DRAWINGS

FIG. 8(*b*) is a schematic diagram of a definition of encoding according to an embodiment of the present disclosure;

FIG. 8(*c*) is a schematic diagram in which four data fields are used for service data according to an embodiment of the present disclosure;

FIG. 8(*d*) is a schematic diagram in which at least one of four data fields is used for control data according to an embodiment of the present disclosure;

DESCRIPTION OF EMBODIMENTS

To make objectives, technical solutions, and advantages of this application clearer, the following further describes implementations of the present disclosure in detail with reference to the accompanying drawings.

An embodiment of the present disclosure provides a data transmission method, applied to a high-speed Ethernet egress port or a low-speed Ethernet egress port (hereinafter collectively referred to as an Ethernet egress port). The method may be executed by a switch or a host. The switch may be obtained by upgrading hardware at a physical layer or a MAC layer of an original switch, and the hardware at the physical layer or the MAC layer may be upgraded by using a new chip or by updating new code at the physical layer. Similarly, the host may be obtained by upgrading hardware at a physical layer or a MAC layer of an original network adapter in the host, and the hardware at the physical layer or the MAC layer may be upgraded by using a new chip or by updating new code at the physical layer.

Figure 1A:
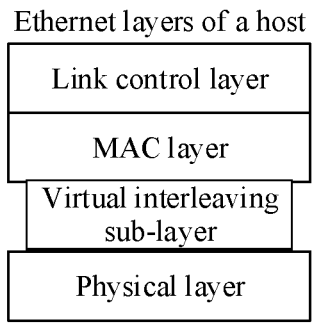
FIG. 1(a) is a schematic diagram of Ethernet layers according to an embodiment of the present disclosure.
Figure 1B:
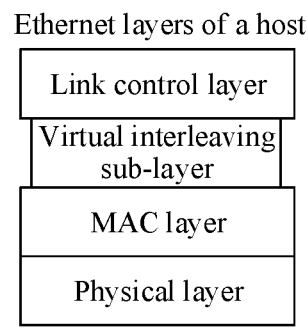
FIG. 1(b) is a schematic diagram of Ethernet layers according to an embodiment of the present disclosure.

As shown in FIG. 1(*a*), hardware at a physical layer of a network adapter in a host is upgraded, so that Ethernet layers of an Ethernet egress port may be classified into a link control layer, a MAC control layer, a MAC layer, a virtual interleaving sub-layer (VIS), and a physical layer from top to bottom. In other words, the virtual interleaving sub-layer is added below the MAC layer and above the physical layer of the original layers. Alternatively, as shown in FIG. 1(*b*), hardware at a MAC layer of a network adapter in a host is upgraded, so that Ethernet layers of an Ethernet egress port may be classified into a link control layer, a MAC control layer, a virtual interleaving sub-layer, a MAC layer, and a physical layer from top to bottom. In other words, the virtual interleaving sub-layer is added below the link control layer and above the MAC layer of the original layers.

Figure 2A:
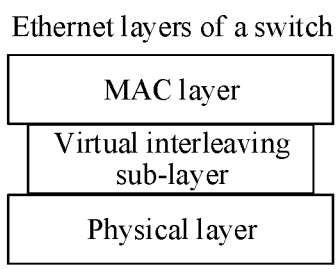
FIG. 2(a) is a schematic diagram of Ethernet layers according to an embodiment of the present disclosure.
Figure 2B:
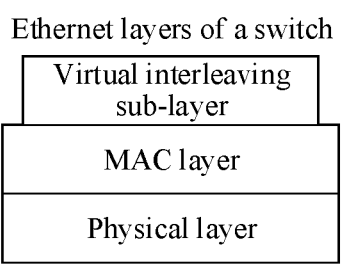
FIG. 2(b) is a schematic diagram of Ethernet layers according to an embodiment of the present disclosure.

As shown in FIG. 2(*a*), hardware at a physical layer of a switch is upgraded, so that Ethernet layers of an Ethernet egress port may be classified into a MAC layer, a virtual interleaving sub-layer, and a physical layer from top to bottom. In other words, the virtual interleaving sub-layer is added below the MAC layer and above the physical layer of the original layers. Alternatively, as shown in FIG. 2(*b*), hardware at a MAC layer of a switch is upgraded, so that Ethernet layers of an Ethernet egress port may be classified into a virtual interleaving sub-layer, a MAC layer, and a physical layer from top to bottom. In other words, the virtual interleaving sub-layer is added below the link control layer and above the MAC layer of the original layers.

In addition, the virtual interleaving sub-layer may also be referred to as a multiplexing layer.

Figure 3:
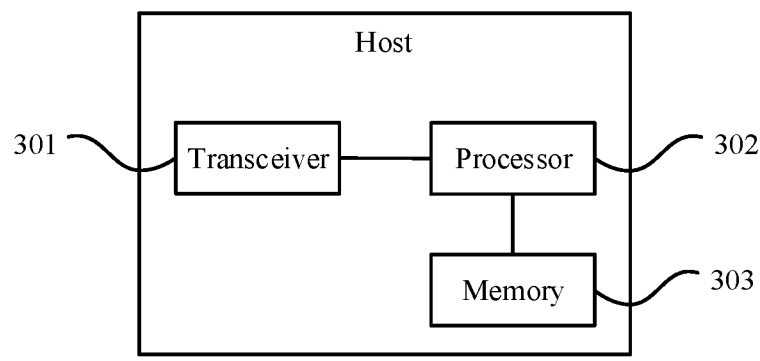
FIG. 3 is a schematic structural diagram of a host according to an embodiment of the present disclosure.

FIG. 3 is a structural block diagram of a host according to an embodiment of the present disclosure. The host may include at least a transceiver 301, a processor 302, and a memory 303. The transceiver 301 may be configured to receive and send data. The memory 303 may be configured to store a software program and a module. The processor 302 executes various functions and data processing by running the software program and the module stored in the memory 303. The memory 303 may mainly include a program storage area and a data storage area. The program storage area may store an operating system, an application program required by at least one function (such as a voice playback function and an image playback function), and the like. The data storage area may store data created based on usage of the host, and the like. In addition, the memory 303 may include a high speed random access memory, and may further include a nonvolatile memory, such as at least one magnetic disk storage device, a flash memory, or another volatile solid-state storage device. Correspondingly, the memory 303 may further include a memory controller, to provide the processor 302 and the transceiver 301 with access to the memory 303. As a control center of the host, the processor 302 connects various parts of the entire host by using various interfaces and lines, and performs various functions of the host and processes data by running or executing the software program and/or the module stored in the memory 303 and by invoking data stored in the memory 303, to perform overall monitoring on the host.

Optionally, the processor 302 may include one or more processing cores. Preferably, an application processor and a modem processor may be integrated into the processor 302, where the application processor mainly processes an operating system, a user interface, an application program, and the like, and the modem processor mainly processes wireless communication. It may be understood that the foregoing modem processor may alternatively not be integrated into the processor 302.

Figure 4:
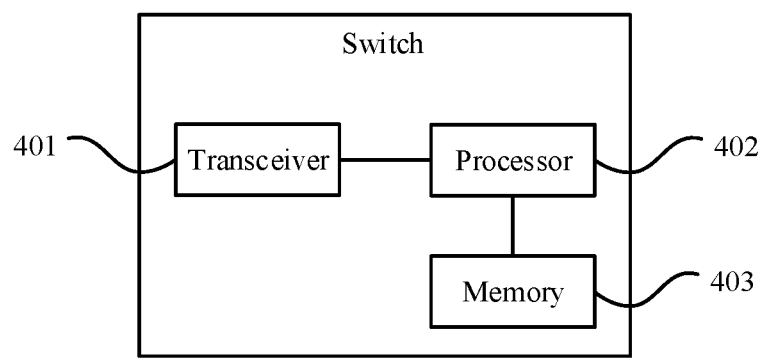
FIG. 4 is a schematic structural diagram of a switch according to an embodiment of the present disclosure.

FIG. 4 is a structural block diagram of a switch according to an embodiment of the present disclosure. The switch may include at least a transceiver 401, a processor 402, and a memory 403. The transceiver 401 may be configured to receive and send data. The memory 403 may be configured to store a software program and a module. The processor 402 executes various functions and data processing by running the software program and the module stored in the memory 403. The memory 403 may mainly include a program storage area and a data storage area. The program storage area may store an operating system, an application program required by at least one function, and the like. The data storage area may store data created based on usage of the switch, and the like. In addition, the memory 403 may include a high speed random access memory, and may further include a nonvolatile memory, such as at least one magnetic disk storage device, a flash memory, or another volatile solid-state storage device. Correspondingly, the memory 403 may further include a memory controller, to provide the processor 402 and the transceiver 401 with access to the memory 403. As a control center of the switch, the processor 402 connects various parts of the entire switch by using various interfaces and lines, and performs various functions of the switch and processes data by running or executing the software program and/or the module stored in the memory 403 and by invoking data stored in the memory 403, to perform overall monitoring on the switch.

Figure 5:
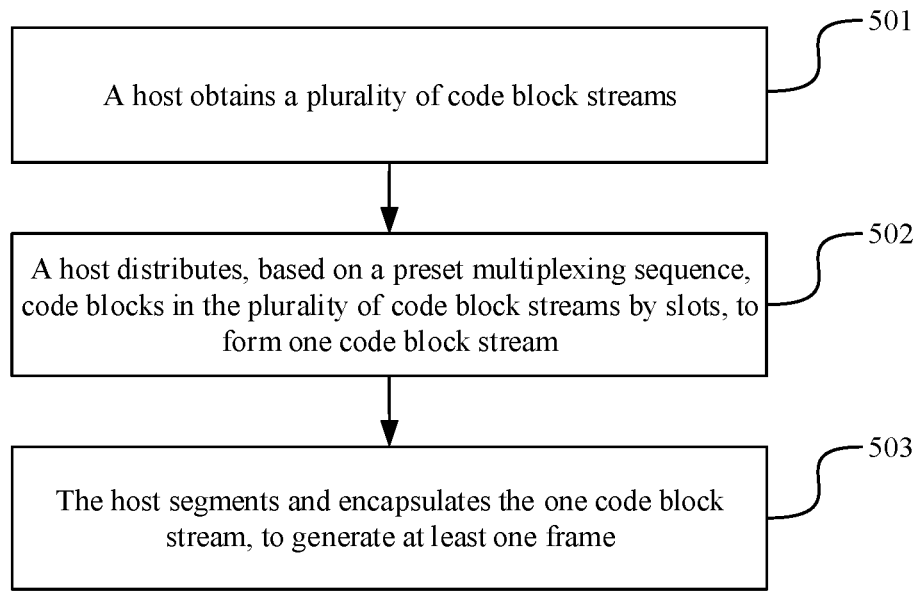
FIG. 5 is a schematic flowchart of a data transmission method according to an embodiment of the present disclosure.

Optionally, the processor 402 may include one or more processing cores. Preferably, an application processor and a modem processor may be integrated into the processor 402, where the application processor mainly processes an operating system, a user interface, an application program, and the like, and the modem processor mainly processes wireless communication. It may be understood that the foregoing modem processor may alternatively not be integrated into the processor 402. As shown in FIG. 5, an example in which a host executes a processing procedure is used for providing a detailed description of an embodiment of the present disclosure. A processing procedure of a data transmission method may include the following steps.

Step 501. A host obtains a plurality of code block streams.

In an implementation, a virtual interleaving sub-layer is set between a MAC layer and a physical layer. When there is data in the host needed to be transmitted externally, the data is usually sent to the MAC layer by using a link control layer, and then the data is sent to the virtual interleaving sub-layer through the MAC layer. The host may obtain the plurality of code block streams from the MAC layer through the virtual interleaving sub-layer. The plurality of code block streams may belong to a same service, or may belong to different services.

The virtual interleaving sub-layer is set between the MAC layer and the link control layer. When there is data in the host needed to be transmitted externally, the host may obtain the plurality of code block streams from the link control layer through the virtual interleaving sub-layer. The plurality of code block streams may belong to a same service, or may belong to different services.

Step 502. The host distributes, based on a preset multiplexing sequence, code blocks in the plurality of code block streams by slots, to form one code block stream.

The preset multiplexing sequence may be preset by a person skilled in the art, and stored in the host. The preset multiplexing sequence may include N interleaved slots. The preset multiplexing sequence may also be referred to as a preset distribution sequence.

In an implementation, the virtual interleaving sub-layer is set between the MAC layer and the physical layer. After the plurality of code block streams are obtained through the virtual interleaving sub-layer, the code blocks in each of the plurality of code block streams may be distributed to a slot to which the code block stream belongs, and the code blocks are distributed to a corresponding slot. In this way, one code block stream is formed, thereby implementing time division multiplexing.

The virtual interleaving sub-layer is set between the MAC layer and the link control layer. After the plurality of code block streams are obtained through the virtual interleaving sub-layer, the code blocks in each of the plurality of code block streams may be distributed to a slot to which the code block stream belongs, and the code blocks are distributed to a corresponding slot. In this way, one code block stream is formed, thereby implementing time division multiplexing. Then, the one code block stream is sent to the MAC layer through the virtual interleaving sub-layer.

Optionally, a process of distributing by slots may be as follows:

distributing the code blocks in each of the plurality of code block streams to a corresponding slot based on a correspondence between a slot in the preset multiplexing sequence and a code block stream.

In an implementation, the preset multiplexing sequence includes N slots, and each slot is corresponding to a code block stream. A code block stream number may be corresponding to a slot number. The code blocks in each of the plurality of code block streams may be distributed to a corresponding slot through the virtual interleaving sub-layer.

Optionally, in a case in which the virtual interleaving sub-layer is set between the MAC layer and the physical layer, the correspondence between a slot in the multiplexing sequence and an obtaining interface may be further used to perform distribution by slots. Corresponding processing may be as follows:

distributing, based on a correspondence between a slot in the preset multiplexing sequence and an obtaining interface, and based on an obtaining interface of the plurality of code block streams, the code blocks in each of the plurality of code block streams to a corresponding slot.

The correspondence between a slot in the multiplexing sequence and an obtaining interface may be a correspondence between a slot number and an obtaining interface number, as shown in Table 1.

TABLE 1

| Slot | Obtaining interface |
|---|---|
| 1 | 1 |
| 2 | 2 |
| 3 | 1 |
| 4 | 3 |
| ... | ... |

Figure 6:
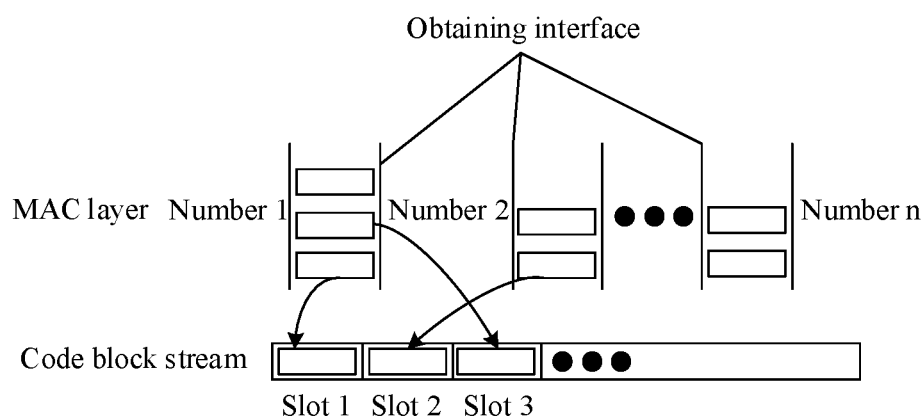
FIG. 6 is a schematic diagram of distributing a plurality of code block streams according to an embodiment of the present disclosure.

In an implementation, there are a plurality of obtaining interfaces at the MAC layer, which are separately used to transmit different code block streams. After any of the code block streams is received through the virtual interleaving sub-layer, it may be determined that an obtaining interface of the code block stream at the MAC layer is obtained. Then, the code blocks in the code block stream are distributed to a corresponding slot based on the correspondence between a slot in the multiplexing sequence and an obtaining interface. As shown in FIG. 6, an obtaining interface number is 1, and corresponding slot numbers are 1, 3, and the like. A first code block received through the obtaining interface numbering 1 is distributed to a slot numbering 1, and a second code block received through the obtaining interface numbering 1 is distributed to a slot numbering 3. An obtaining interface number is 2, and corresponding slot numbers are 2, and the like. A first code block received through the obtaining interface numbering 2 may be distributed to a slot numbering 2, and the like.

It should be noted that, the slot mentioned in the embodiments of the present disclosure refers to transmission duration of a code block transmitted in the slot. Different slots may be used to transmit code blocks in a same code block stream, or may be used to transmit code blocks in different code block streams.

Step 503. The host segments and encapsulates the one code block stream, to generate at least one frame.

In an implementation, the virtual interleaving sub-layer is set between the MAC layer and the physical layer. After the plurality of code block streams form the one code block stream through the virtual interleaving sub-layer, the one code block stream is segmented and then encapsulated, to generate the at least one frame. The frame may also be referred to as an Ethernet frame, and the frame may also be referred to as a VIS frame, or may be referred to as a multiplexing frame. The generated frame is sent to the physical layer for processing before being sent. In addition, to avoid frame overflow, a frame gap may be inserted between two adjacent frames through the virtual interleaving sub-layer, or a packet gap may be inserted.

The virtual interleaving sub-layer is set between the MAC layer and the link control layer. After one code block stream is received through the MAC layer, the one code block stream is segmented through the MAC layer and then encapsulated, to generate at least one frame. The frame may also be referred to as an Ethernet frame, and the frame may also be referred to as a VIS frame, or may be referred to as a multiplexing frame. The generated frame is sent to the physical layer for processing before being sent. In addition, to avoid frame overflow, a frame gap may be inserted between two adjacent frames through the MAC layer, or a packet gap may be inserted.

Optionally, a frame length may be used to segment and encapsulate one code block stream, and corresponding processing may be as follows:

segmenting and encapsulating the one code block stream based on a preset frame length, to generate at least one frame.

Figure 7:
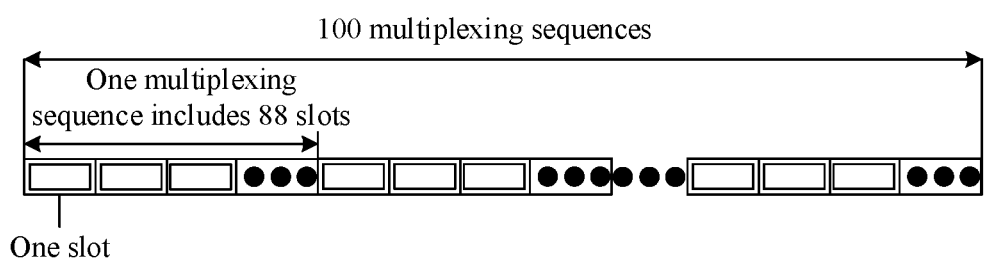
FIG. 7 is a schematic diagram of a frame according to an embodiment of the present disclosure.

The preset frame length may be preset by a person skilled in the art, and the preset frame length may be M multiplexing sequences. For example, as shown in FIG. 7, M is 100, the multiplexing sequence includes 88 slots, and the preset frame length is 8,800 slots.

In an implementation, the virtual interleaving sub-layer is set between the MAC layer and the physical layer. The one code block stream is divided into code block streams through the virtual interleaving sub-layer, the code block streams are encapsulated, so that a length of an encapsulated frame is equal to the preset frame length. In this way, the virtual interleaving sub-layer is used to generate one frame by using every M multiplexing sequences. For example, M is 100, the multiplexing sequence includes 88 slots, and one frame includes 8,800 slots.

The virtual interleaving sub-layer is set between the MAC layer and the link control layer. The one code block stream is divided into code block streams through the MAC layer, the code block streams are encapsulated, so that a length of an encapsulated frame is equal to the preset frame length. In this way, the virtual interleaving sub-layer is used to generate one frame by using every M multiplexing sequences.

Optionally, the virtual interleaving sub-layer is set between the MAC layer and the physical layer. Segmentation and encapsulation are performed in a plurality of encapsulation manners. Two feasible manners are provided as follows:

Manner 1: The one code block stream is segmented, and a frame header field is inserted into each segment, to generate at least one frame.

In an implementation, after one code block stream is segmented through the virtual interleaving sub-layer, a frame header field is inserted at a start position of each segment to define a start of the frame. In this way, a plurality of frames are obtained, and the frame header field may be a preamble.

Correspondingly, a frame format of a frame in the at least one frame is a frame header field, and a first preset quantity of multiplexing sequences, and each multiplexing sequence includes a second preset quantity of code blocks. A first preset quantity and a second preset quantity may be preset by a person skilled in the art, the first preset quantity may be M mentioned above, and the second preset quantity may be N mentioned above.

Manner 2: The one code block stream is segmented, and a frame header field and a frame trailer field are inserted into each segment, to generate at least one frame.

In an implementation, after one code block stream is segmented through the virtual interleaving sub-layer, a frame header field is inserted at a start position of each segment, and a frame trailer field is inserted at an end position. Similarly, the frame header field is used to define a start of the frame, and the frame trailer field is used to detect whether the frame is damaged. The frame header field may be a preamble, and the frame trailer field may be a CRC field.

Correspondingly, a frame format of a frame in the at least one frame is a frame header field, a first preset quantity of multiplexing sequences, and a frame trailer field, and each multiplexing sequence includes a second preset quantity of slots. A first preset quantity and a second preset quantity may be preset by a person skilled in the art, the first preset quantity may be M mentioned above, and the second preset quantity may be N mentioned above.

Optionally, the virtual interleaving sub-layer is set between the MAC layer and the link control layer. Segmentation and encapsulation are performed in a plurality of encapsulation manners. Two feasible manners are provided as follows:

Manner 1: The one code block stream is segmented, and a frame header field, a destination MAC address, a source MAC address, and an Ethernet type field are inserted into each segment, to generate at least one frame.

The destination MAC address is any MAC address preset by a person skilled in the art, and is not used for addressing. The source MAC address is a MAC address of an Ethernet egress port, and the Ethernet type field is used to identify that the frame is an Ethernet type frame, and may be a field preset by a person skilled in the art.

In an implementation, after one code block stream is segmented through the virtual interleaving sub-layer, the frame header field, the destination MAC address, the source MAC address, the Ethernet type field are inserted at a start position of each segment. The frame header field is used to define a start of the frame, and the Ethernet field is used to identify that the frame is an Ethernet type frame. The frame header field may be a preamble.

Correspondingly, a frame format of a frame in the at least one frame is the frame header field, the destination MAC address, the source MAC address, the Ethernet type field, and a third preset quantity of multiplexing sequences, and each multiplexing sequence includes a fourth preset quantity of slots.

Manner 2: The one code block stream is segmented, and a frame header field, a destination MAC address, a source MAC address, an Ethernet type field, and a frame trailer field are inserted into each segment, to generate at least one frame.

The destination MAC address is any MAC address preset by a person skilled in the art, and is not used for addressing. The source MAC address is a MAC address of an Ethernet egress port, and the Ethernet type field is used to identify that the frame is an Ethernet type frame, and may be a field preset by a person skilled in the art.

In an implementation, after one code block stream is segmented through the virtual interleaving sub-layer, the frame header field, the destination MAC address, the source MAC address, and the Ethernet type field are sequentially inserted at a start position of each segment, and the frame trailer field is inserted at an end position of each segment. The frame header field is used to define a start of the frame, and the Ethernet field is used to identify that the frame is an Ethernet type frame. The frame trailer field is used to detect whether the frame is damaged. The frame header field may be a preamble, and the frame trailer field may be a CRC field.

Correspondingly, a frame format of a frame in the at least one frame is the frame header field, the destination MAC address, the source MAC address, the Ethernet type field, a third preset quantity of multiplexing sequences, and a frame trailer field, and each multiplexing sequence includes a fourth preset quantity of slots.

The third preset quantity mentioned above may be equal to N mentioned above, and the fourth preset quantity may be equal to M mentioned above.

For the foregoing embodiment, the following processing manner of obtaining the plurality of code block streams in step 501 is provided.

One service data stream is received, and the one service data stream is encoded in a preset data encoding manner, to obtain any one of the plurality of code block streams.

In an implementation, a source of any one of the plurality of code block streams may be: after one service data stream is received, the one service data stream is encoded in a preset data encoding manner, to obtain the one code block stream. In addition to the one code block stream, a source of another code block stream may be: at least one code block stream is directly received, or at least one service data stream is received, and the at least one service data stream is encoded, to obtain at least one code block stream. The another code block stream is at least one code block stream obtained by encoding. Data encoding manners used for encoding the at least one code block stream may be the same, or may be different. Alternatively, a source of another code block stream may be: at least one service data stream and at least one code block stream are received, and the at least one service data stream is encoded, to obtain at least one code block stream. In this way, the another code block stream is at least one code block stream obtained by encoding and at least one received code block stream, and data encoding manners used for encoding the at least one code block stream may be the same, or may be different.

For the foregoing embodiment, the following two processing manners of obtaining the plurality of code block streams in step 501 are provided. Corresponding processing may be as follows.

Manner 1: At least one service data stream and at least one code block stream are received, and each service data stream in the preset data encoding manner is encoded, to obtain at least one code block stream; and the at least one code block stream obtained by encoding and the at least one received code block stream are obtained.

The preset data encoding manner may be preset by a person skilled in the art and stored in the host.

In an implementation, the virtual interleaving sub-layer is set between the MAC layer and the physical layer. After at least one service data stream and at least one code block stream are received from the MAC layer through the virtual interleaving sub-layer, each service data stream may be encoded in the preset data encoding manner, to obtain at least one code block stream. Further, the at least one received code block stream and at least one code block stream obtained by encoding may be obtained, to obtain the plurality of code block streams.

In an implementation, the virtual interleaving sub-layer is set between the MAC layer and the link control layer. After at least one service data stream and at least one code block stream are received from the link control layer through the virtual interleaving sub-layer, each service data stream may be encoded in the preset data encoding manner, to obtain at least one code block stream. Further, the at least one received code block stream and the at least one code block stream obtained by encoding may be obtained, to obtain the plurality of code block streams.

In this way, if the service data stream is received, the service data stream may be encoded to obtain the code block stream, and the received code block stream does not need to be processed.

Manner 2: A plurality of service data streams are received, and each service data stream is encoded based on the preset data encoding manner, to obtain the plurality of code block streams.

The preset data encoding manner may be preset by a person skilled in the art, and stored in the host.

In an implementation, the virtual interleaving sub-layer is set between the MAC layer and the physical layer. After the plurality of service data streams are received from the MAC layer through the virtual interleaving sub-layer, each service data stream may be encoded in the preset data encoding manner, to obtain the plurality of code block streams.

The virtual interleaving sub-layer is set between the MAC layer and the link control layer. After the plurality of service data streams are received from the link control layer through the virtual interleaving sub-layer, each service data stream may be encoded in the preset data encoding manner, to obtain the plurality of code block streams.

It should be noted that in the foregoing Manner 1 and Manner 2, the plurality of service data streams may be separately encoded by using a plurality of encoding modules, or the plurality of service data streams may be encoded by using one encoding module.

In addition, it should be further noted that in the foregoing Manner 1 and Manner 2, each service data stream is encoded in the preset data encoding manner. In actual processing, different service data streams may also be encoded in different data encoding manners.

Optionally, the preset data encoding manner is any one of 8B/9B encoding, 64B/66B encoding, and 256B/257B encoding.

In an implementation, data encoding manners of 64B/66B encoding and 256B/257B encoding are frequently used data encoding manners in the prior art, and details are not described herein again.

In the data encoding manner of 8B/9B encoding, each service data stream is encoded into a code block including one data field. Each data field has nine bits, and a highest bit [8] is used for indication. When the highest bit [8] is 0b0, it indicates a service data block, and when the highest bit [8] is 0b1, it indicates a control data block. The remaining eight bits [7:0] occupy the eight lower bits, which are used to store service data or control data. For example, as shown in FIG. 8($a$), the highest bit [8] is 1, and the remaining eight bits [7:0] are 0x00 in a hexadecimal format, occupying eight bits. The 8-bit control data is used to indicate an idle state. The highest bit [8] is 1, and the remaining eight bits [7:0] are 0x01 in a hexadecimal format, occupying eight bits. The 8-bit control data is used to indicate a low-power state. The highest bit [8] is 0b1, and the remaining eight bits [7:0] are 0x5A in a hexadecimal format, occupying eight bits. The 8-bit control data is used to indicate a start of a frame. The highest bit [8] is 0b1, and the remaining eight bits [7:0] are 0xA5 in a hexadecimal format, occupying eight bits. The 8-bit control data is used to indicate an end of a frame. The highest bit [8] is 0b0, and the remaining eight bits [7:0] are 0x00 to 0xFF in a hexadecimal format, occupying eight bits. The eight bits are used for service data.

In the data encoding manner of the 8B/9B encoding, it can be learned that one bit in every nine bits is used to indicate whether the data is control data or service data. Therefore, if there is 1 Gbps bandwidth, after encoding is performed in the foregoing encoding manner, actual valid data bandwidth is 1 Gbps*(8/9)=0.89 Gbps.

Optionally, on a basis of the data encoding manner of the 8B/9B encoding, the data encoding manner is improved to the following data encoding manner.

For each service data stream, the service data stream is encoded into a code block including four data fields and at least one flag field, and a first indication identifier is set for each code block in a flag field of the code block, where the first indication identifier indicates a first state or a second state.

Control data and service data are in the data field, and the flag field is used to set the first indication identifier and a second indication identifier. If the four data fields are used for service data, there is only one flag field; or if at least one of the four data fields is used for control data, there are two flag fields, one is used to set the first indication identifier, and the other is used to set the second indication identifier.

Figures 8A, 8B, 8C, 8D:
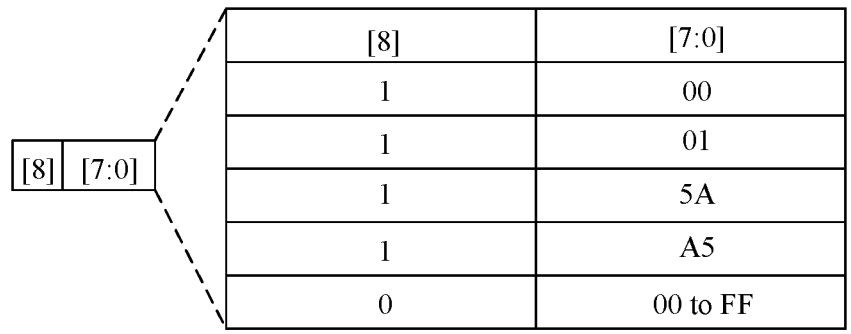
FIG. 8(*a*) is a schematic diagram of a definition of encoding according to an embodiment of the present disclosure.

In an implementation, on the basis of the data encoding manner of 8B/9B encoding, the data field is redefined as shown in FIG. 8(b), the highest bit [8] is used to indicate the first indication identifier (e.g., the first indication identifier occupies one bit). The first indication identifier indicates a first state or a second state. The first state may be represented by 0b0, and the second state may be represented by 0b1. The remaining eight bits [7:0] occupy the eight lower bits. The highest bit [8] is 0b1, and the remaining eight bits [7:0] are 0x0 in a hexadecimal format, occupying four bits of the remaining eight bits. The 4-bit control data is used to indicate an idle state. The highest bit [8] is 0b1, and the remaining eight bits [7:0] are 0x1 in a hexadecimal format, occupying four bits of the remaining eight bits. The 4-bit control data is used to indicate a low-power state. The highest bit [8] is 0b1, and the remaining eight bits [7:0] are 0x2 in a hexadecimal format, occupying four bits of the remaining eight bits. The 4-bit control data is used to indicate a start of a frame. The highest bit [8] is 0b1, and the remaining eight bits [7:0] are 0x3 in a hexadecimal format, occupying four bits of the remaining eight bits. The 4-bit control data is used to indicate an end of a frame. The highest bit [8] is 0b0, and the remaining eight bits [7:0] are 0x00 to 0xFF in a hexadecimal format, occupying eight bits. The eight bits are used for service data.

After the data field is redefined, and when the data field is used for control data, the four bits [7:4] of the remaining eight bits [7:0] are not used. Therefore, for each service data stream, every four data fields and at least one control field form one code block when data is encoded. A first indication identifier is set for each code block in a flag field of the code block. In this case, there is only one flag field. As shown in FIG. 8(c), there is one flag field and four data fields. The first indication identifier indicating a first state is set in the flag field, and occupies one bit. Each of the four data fields is used for service data, and each data field occupies eight bits. When the first indication identifier indicates a second state, it indicates that at least one of the four data fields is used for control data. If a second indication identifier is set in a flag field of a code block whose at least one of four data fields is used for control data, the second indication identifier occupies four bits, and is used to indicate locations of service data and the control data in the code block, in other words, used to indicate which data field is used for the control data, and which data field is used for the service data. First control data in the four data fields occupies four bits (because four bits are used by the second indication identifier), and regardless of whether each of the remaining three data fields is used for the control data or the service data, each of the remaining three data fields occupies eight bits. In this case, there are two flag fields, a first flag field is used to set the first indication identifier, and a second flag field is used to set the second indication identifier. For example, as shown in FIG. 8(d), there are two flag fields and four data fields. A first flag field in the two flag fields that is used for a first indication identifier indicates a second state and occupies one bit. A second flag field that is used for a second indication identifier occupies four bits. In the four data fields, two data fields are used for control data, a first data field and a third data field are used for service data, a second data field and a fourth data field are used for control data, and the control data in the second data field occupies four bits.

In this way, in the improved encoding manner, overheads of an indication bit of the control data may be reduced. For example, if there is 1 Gbps bandwidth, after encoding is performed in the foregoing data encoding manner, actual valid data bandwidth is 1 Gbps*(32/33)=0.9846 Gbps. The valid bandwidth is actually larger than the valid bandwidth in the data encoding manner of the 8B/9B encoding.

It should be noted that the data field may also be referred to as a field. A flag field occupied by the second indication identifier may also be referred to as a map (MAP) field.

Figure 9:
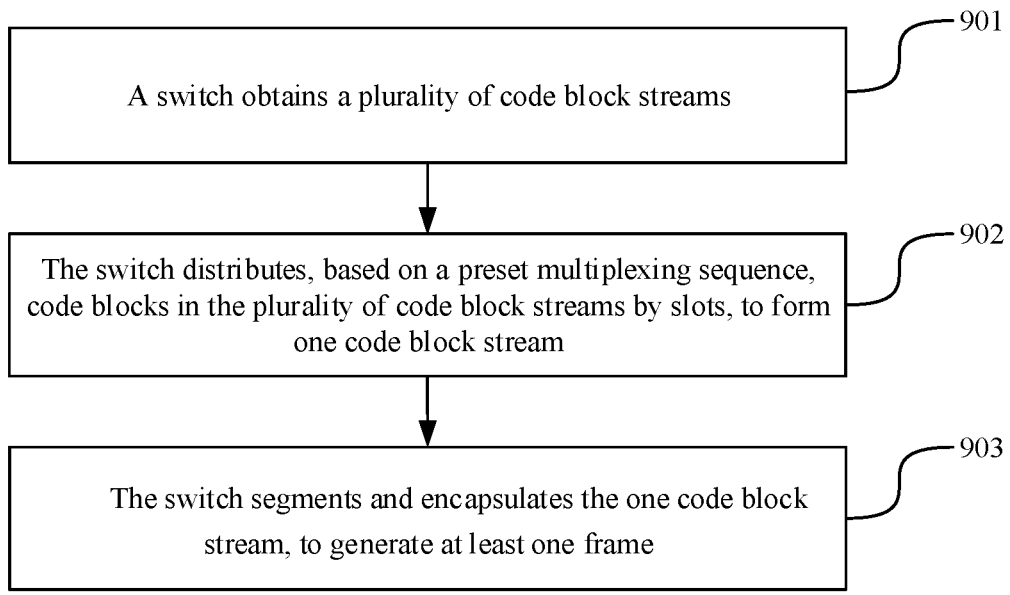
FIG. 9 is a schematic flowchart of a data transmission method according to an embodiment of the present disclosure.

As shown in FIG. 9, an example in which a switch executes a processing procedure is used for providing a detailed description of another embodiment of the present disclosure. A processing procedure of a data transmission method may include the following steps.

Step 901. A switch obtains a plurality of code block streams.

In an implementation, a virtual interleaving sub-layer is set between a MAC layer and a physical layer. After any frame is received through the physical layer of an Ethernet ingress port of the switch, the frame is processed through the physical layer, transmitted to the virtual interleaving sub-layer of the Ethernet ingress port, and decapsulated through the virtual interleaving sub-layer, to obtain one code block stream. Each code block in the one code block stream is corresponding to a slot. A plurality of code blocks in a slot corresponding to a same encoding stream form a same code block stream based on a correspondence between a slot in a preset multiplexing sequence and a code block stream, and based on a slot corresponding to each code block in the one code block stream. In this way, a plurality of code block streams are obtained. Then, code blocks in the plurality of code block streams are decoded in a preset data decoding manner, to obtain a plurality of service data streams. Then, the plurality of service data streams are sent to the MAC layer of the Ethernet ingress port through the virtual interleaving sub-layer. The switch may separately transmit the plurality of service data streams to a MAC layer of an Ethernet egress port through the MAC layer of the Ethernet ingress port. After the plurality of service data streams are received through the MAC layer of the Ethernet egress port, the plurality of service data streams may be sent to the virtual interleaving sub-layer through the MAC layer of the Ethernet egress port. The received service data streams are encoded separately (a data encoding manner is described in the embodiment shown in FIG. 5) through the virtual interleaving sub-layer, to obtain a plurality of code block streams.

Alternatively, the virtual interleaving sub-layer is set between the MAC layer and the physical layer. After any frame is received through the physical layer of the Ethernet ingress port of the switch, the frame is processed through the physical layer, transmitted to the virtual interleaving sub-layer, and decapsulated through the virtual interleaving sub-layer, to obtain one code block stream. Each code block in the one code block stream is corresponding to a slot. A plurality of code blocks in a slot corresponding to a same encoding stream form a same code block stream based on a correspondence between a slot in a preset multiplexing sequence and a code block stream, and based on a slot corresponding to each code block in the one code block stream. In this way, a plurality of code block streams are obtained. Then, the plurality of code block streams are sent to a switching module in the switch through the virtual interleaving sub-layer of the Ethernet ingress port. The switch separately sends, by using the switching module, the plurality of code block streams to a virtual interleaving sub-layer of a corresponding Ethernet egress port based on a correspondence between a slot of an Ethernet ingress port and an Ethernet egress port. The plurality of code block streams are received through the virtual interleaving sub-layer of the Ethernet egress port.

The virtual interleaving sub-layer is set between the MAC layer and a link control layer. After any frame is received through the physical layer of the Ethernet ingress port of the switch, the frame is transmitted to the MAC layer of the Ethernet ingress port after being processed through the physical layer, and the frame is decapsulated through the MAC layer, to obtain one code block stream. Then, the one code block stream is sent to the virtual interleaving sub-layer of the Ethernet ingress port through the MAC layer. A plurality of code blocks in a slot corresponding to a same encoding stream form a same code block stream through the virtual interleaving sub-layer based on the correspondence between a slot in the preset multiplexing sequence and a code block stream, and based on the slot corresponding to code blocks in the one code block stream. In this way, a plurality of code block streams are obtained. Then, the plurality of code block streams are sent to a switching module in the switch through the virtual interleaving sub-layer of the Ethernet ingress port. The switch separately sends, by using the switching module, the plurality of code block streams to the virtual interleaving sub-layer of the corresponding Ethernet egress port based on a correspondence between a slot of an Ethernet ingress port and an Ethernet egress port. The plurality of code block streams are received through the virtual interleaving sub-layer of the Ethernet egress port.

Step 902. The switch distributes, based on a preset multiplexing sequence, code blocks in the plurality of code block streams by slots, to form one code block stream.

The preset multiplexing sequence may be preset by a person skilled in the art, and stored in the host, and the preset multiplexing sequence may include N interleaved slots. The preset multiplexing sequence may also be referred to as a preset distribution sequence.

In an implementation, the virtual interleaving sub-layer is set between the MAC layer and the physical layer. After the plurality of code block streams are obtained through the virtual interleaving sub-layer, code blocks in each of the plurality of code block streams may be distributed to a slot to which the code block stream belongs, and the code blocks are distributed to a corresponding slot. In this way, one code block stream is formed, thereby implementing time division multiplexing. Then, the one code block stream is sent to the physical layer through the virtual interleaving sub-layer.

The virtual interleaving sub-layer is set between the MAC layer and the link control layer. After the plurality of code block streams are obtained through the virtual interleaving sub-layer, code blocks in each of the plurality of code block streams may be distributed to a slot to which the code block stream belongs, and the code blocks are distributed to a corresponding slot. In this way, one code block stream is formed, thereby implementing time division multiplexing. Then, the one code block stream is sent to the MAC layer through the virtual interleaving sub-layer.

Optionally, regardless of whether the virtual interleaving sub-layer is set between the MAC layer and the physical layer, or the virtual interleaving sub-layer is set between the MAC layer and the link control layer, the code blocks in the plurality of code block streams may be distributed by slots in two manners.

Manner 1: The code blocks in each of the plurality of code block streams are distributed to a corresponding slot based on a correspondence between a slot in the preset multiplexing sequence and a code block stream.

The preset multiplexing sequence may be preset by a person skilled in the art, and includes N slots, and each slot is corresponding to a code block stream.

In an implementation, after the plurality of code block streams are obtained through the virtual interleaving sub-layer of the Ethernet egress port (because there is not only one Ethernet ingress port in one switch, a plurality of code block streams transmitted through a plurality of Ethernet ingress ports may be received through the Ethernet egress port), code blocks in each of the plurality of code block streams are sent to a corresponding slot through the virtual interleaving sub-layer based on a correspondence between a slot in the multiplexing sequence and a code block stream. In this way, the plurality of code block streams are distributed to form one code block stream, to implement time division multiplexing.

Manner 2: The code blocks in each of the plurality of obtained code block streams are distributed to a corresponding slot of the Ethernet egress port based on a correspondence between a slot of an Ethernet egress port and a slot of an Ethernet ingress port in the preset multiplexing sequence, and based on a slot of the Ethernet ingress port of the code blocks in the plurality of code block streams.

The preset multiplexing sequence may be preset by a person skilled in the art, and includes N slots.

In an implementation, after the plurality of code block streams are received through the virtual interleaving sub-layer of the Ethernet egress port (because there is not only one Ethernet ingress port in one switch, a plurality of code block streams transmitted through a plurality of Ethernet ingress ports may be received through the Ethernet egress port), code blocks in each of the plurality of code block streams are distributed to a corresponding slot of the Ethernet egress port based on a correspondence between a slot of an Ethernet egress port and a slot of an Ethernet ingress port in the preset multiplexing sequence. In this way, the plurality of code block streams are distributed to form one code block stream, to implement time division multiplexing.

Step 903. The switch segments and encapsulates the one code block stream, to generate at least one frame.

In an implementation, the virtual interleaving sub-layer is set between the MAC layer and the physical layer. After one code block stream is obtained through the virtual interleaving sub-layer of the Ethernet egress port, the one code block stream is encapsulated after being segmented through the virtual interleaving sub-layer, to generate at least one frame. The frame may also be referred to as an Ethernet frame, and the frame may also be referred to as a VIS frame, or may be referred to as a multiplexing frame. The generated frame is sent to the physical layer for processing before being sent. In addition, to avoid frame overflow, a frame gap may be inserted between two adjacent frames through the virtual interleaving sub-layer, or a packet gap may be inserted.

The virtual interleaving sub-layer is set between the MAC layer and the link control layer. After one code block stream is obtained through the virtual interleaving sub-layer of the Ethernet egress port, the one code block stream may be sent to the MAC layer of the Ethernet egress port through the virtual interleaving sub-layer. After the one code block stream is received through the MAC layer, the one code block stream is encapsulated after being segmented, to generate at least one frame. The frame may also be referred to as an Ethernet frame, and the frame may also be referred to as a VIS frame, or may be referred to as a multiplexing frame. The generated frame is sent to the physical layer for processing before being sent. In addition, to avoid frame overflow, a frame gap may be inserted between two adjacent frames through the MAC layer, or a packet gap may be inserted.

Optionally, for a process of segmenting and encapsulating, refer to the processing process in the embodiment shown in FIG. 5, and details are not described herein again.

In the embodiments shown in FIG. 5 and FIG. 9, in an Ethernet egress port, a process of setting the virtual interleaving sub-layer between the MAC layer and the physical layer or a process of setting the virtual interleaving sub-layer between the MAC layer and the link control layer is not related to inserting FlexE Shim into the PCS at the physical layer, so that multiplexing/demultiplexing is irrelevant to the PCS at the physical layer of the Ethernet egress port, and the encoding manner is irrelevant to a modulation and coding mode of the PCS at the physical layer of the Ethernet egress port.

In the embodiments of the present disclosure, the plurality of code block streams are obtained, and the code blocks in the plurality of code block streams are distributed by slots based on the preset multiplexing sequence, to form the one code block stream, and the one code block stream is segmented and encapsulated, to generate the at least one frame. In this way, when data is sent through the Ethernet egress port, the plurality of code block streams may be distributed by slots, to implement time division multiplexing. The plurality of code block streams does not affect each other during transmission, and therefore duration of waiting for transmission of the code block stream is reduced, thereby reducing a data transmission delay. This can meet a service requirement of a service with a relatively high data transmission delay in an industrial Ethernet.

In addition, based on a same technical concept, an embodiment of the present disclosure provides a data transmission method, applied to a high-speed Ethernet ingress port or a low-speed Ethernet ingress port (hereinafter referred to as an Ethernet ingress port). The method may be executed by a switch or a host. The switch may be obtained by upgrading hardware at a physical layer or a MAC layer of an original switch, and the hardware at the physical layer or the MAC layer may be upgraded by using a new chip or by updating new code at the physical layer. Similarly, the host may be obtained by upgrading hardware at a physical layer or a MAC layer of an original network adapter in the host, and the hardware at the physical layer or the MAC layer may be upgraded by using a new chip or by updating new code at the physical layer.

As shown in FIG. 1(*a*), hardware at a physical layer of a network adapter in a host is upgraded, so that layers of an Ethernet ingress port of the host may be classified into a link control layer, a MAC control layer, a MAC layer, a virtual interleaving sub-layer, and a physical layer from top to bottom. It is equivalent to that the virtual interleaving sub-layer is added below the MAC layer and above the physical layer of the original layers. Alternatively, as shown in FIG. 1(*b*), hardware at a MAC layer of a network adapter in a host is upgraded, layers of an Ethernet ingress port of the host may be classified into a link control layer, a MAC control layer, a virtual interleaving sub-layer, a MAC layer, and a physical layer from top to bottom. It is equivalent to that the virtual interleaving sub-layer is added below the link control layer and above the MAC layer of the original layers.

As shown in FIG. 2(*a*), hardware at a physical layer of a switch is upgraded, so that Ethernet layers of an Ethernet ingress port of the switch may be classified into a MAC layer, a virtual interleaving sub-layer, and a physical layer from top to bottom. The hardware at the MAC layer of the switch is upgraded, so that the Ethernet layers of the Ethernet ingress port may be classified into the virtual interleaving sub-layer, the MAC layer, and the physical layer from top to bottom. Alternatively, as shown in FIG. 2(*b*), hardware at a MAC layer of a switch is upgraded, so that layers of an Ethernet ingress port of the switch may be classified into a virtual interleaving sub-layer, a MAC layer, and a physical layer from top to bottom.

In addition, the virtual interleaving sub-layer may also be referred to as a multiplexing layer.

Figure 10:
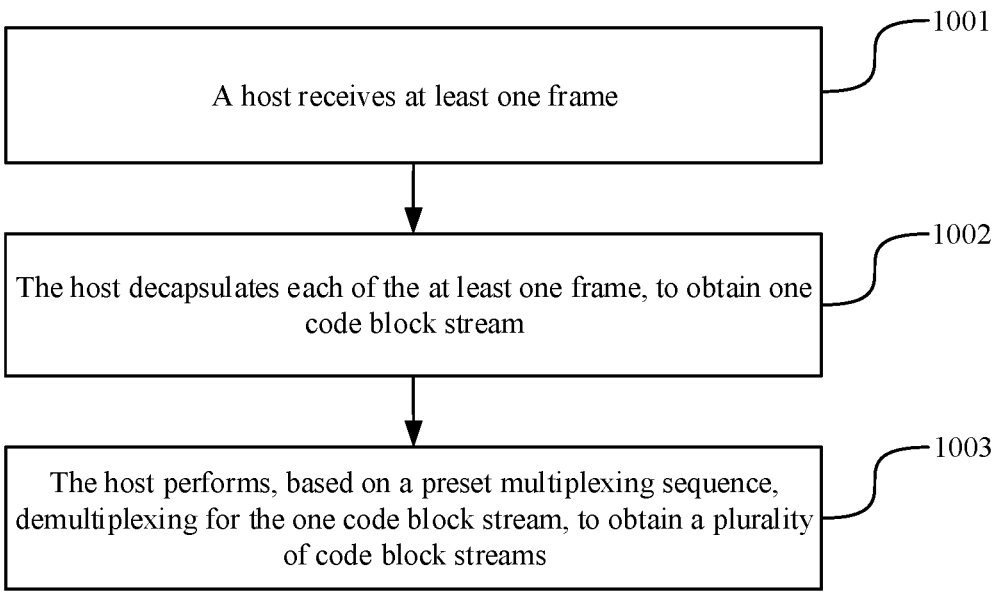
FIG. 10 is a schematic flowchart of a data transmission method according to an embodiment of the present disclosure.

As shown in FIG. 10, an example in which a host executes a processing procedure is used for providing a detailed description of another embodiment of the present disclosure. A processing procedure of a data transmission method may include the following steps.

Step 1001. A host receives at least one frame.

In an implementation, a virtual interleaving sub-layer is set between a MAC layer and a physical layer. After at least one frame is received through the physical layer of an Ethernet ingress port of the host, the at least one frame is processed through the physical layer, and is then transmitted to the virtual interleaving sub-layer of the Ethernet ingress port.

The virtual interleaving sub-layer is set between the MAC layer and a link control layer. After at least one frame is received through the physical layer of the Ethernet ingress port of the host, the at least one frame is processed through the physical layer, and the at least one frame is transmitted to the MAC layer of the Ethernet ingress port.

Step 1002: The host decapsulates each of the at least one frame, to obtain one code block stream.

In an implementation, the virtual interleaving sub-layer is set between the MAC layer and the physical layer. After at least one frame is received through the virtual interleaving sub-layer of the Ethernet ingress port, each of the at least one frame is decapsulated, to obtain one code block stream. This process is an inverse process of step 503 in the embodiment shown in FIG. 5. In addition, if a frame gap exists between adjacent frames, the frame gap is deleted from the frame before the frame is decapsulated.

The virtual interleaving sub-layer is set between the MAC layer and the link control layer. After at least one frame is received through the MAC layer of the Ethernet ingress port, each of the at least one frame is decapsulated, to obtain one code block stream. The one code block stream is transmitted to the virtual interleaving sub-layer of the Ethernet ingress port. This process is an inverse process of step 503 in the embodiment shown in FIG. 5.

Step 1003. The host performs, based on a preset multiplexing sequence, demultiplexing for the one code block stream, to obtain a plurality of code block streams.

In an implementation, the virtual interleaving sub-layer is set between the MAC layer and the physical layer. After one code block stream is obtained through the virtual interleaving sub-layer of the Ethernet ingress port, a plurality of code blocks in a slot corresponding to a same encoding stream form a same code block stream based on a correspondence between a slot in the preset multiplexing sequence and a code block stream, and based on a slot corresponding to each code block in one code block stream. In this way, a plurality of code block streams are obtained, and then the plurality of obtained code block streams are transmitted to the MAC layer through the virtual interleaving sub-layer. The plurality of code block streams are transmitted to the link control layer for processing after being processed through the MAC layer.

The virtual interleaving sub-layer is set between the MAC layer and the link control layer. After one code block stream is received through the virtual interleaving sub-layer of the Ethernet ingress port, a plurality of code blocks in a slot corresponding to a same encoding stream form a same code block stream based on a correspondence between a slot in the preset multiplexing sequence and a code block stream, and based on a slot corresponding to each code block in one code block stream. In this way, a plurality of code block streams are obtained, and then the plurality of obtained code block streams are transmitted to the link control layer through the virtual interleaving sub-layer for processing.

Optionally, in step 1003, after the plurality of code block streams are obtained, code blocks in the plurality of code block streams may be decoded before being sent. Corresponding processing may be as follows:

decoding each code block in the plurality of code block streams in a preset data decoding manner.

The preset data decoding manner may be preset by a person skilled in the art, and may be corresponding to the data encoding manner described in the embodiment shown in FIG. 5.

In an implementation, the virtual interleaving sub-layer is set between the MAC layer and the physical layer, and code blocks in the plurality of obtained code block streams are decoded in the preset data decoding manner through the virtual interleaving sub-layer of the Ethernet ingress port, to obtain a plurality of service data streams. The plurality of service data streams are transmitted to the MAC layer. After the plurality of service data streams are processed through the MAC layer, the plurality of obtained service data streams are transmitted to the link control layer for processing.

The virtual interleaving sub-layer is set between the MAC layer and the link control layer, and code blocks in the plurality of obtained code block streams are decoded in a preset data decoding manner through the virtual interleaving sub-layer of the Ethernet ingress port, to obtain a plurality of service data streams. The plurality of obtained service data streams are transmitted to the link control layer for processing.

Optionally, the virtual interleaving sub-layer is set between the MAC layer and the physical layer, and the frame may be decapsulated in the following manner. Corresponding processing of step 1002 may be as follows:

deleting a frame header field and a frame trailer field from each of the at least one frame, to obtain one code block stream; or deleting a frame header field from each of the at least one frame, to obtain one code block stream.

In an implementation, if any frame in the at least one frame includes a frame header field and a frame trailer field, the frame header field and the frame trailer field are deleted from the frame through the virtual interleaving sub-layer of the Ethernet ingress port, to obtain one code block stream. If any frame in the at least one frame includes only a frame header field, the frame header field is deleted from the frame through the virtual interleaving sub-layer of the Ethernet ingress port, to obtain one code block stream.

Optionally, the virtual interleaving sub-layer is set between the MAC layer and the link control layer, and the frame may be decapsulated in the following manner. Corresponding processing of step 1002 may be as follows:

deleting a frame header field, a destination MAC address, a source MAC address, an Ethernet type field, and a frame trailer field from each of the at least one frame, to obtain the one code block stream; or deleting a frame header field, a destination MAC address, a source MAC address, and an Ethernet type field from each of the at least one frame, to obtain the one code block stream.

In an implementation, if any frame in the at least one frame includes a frame header field, a destination MAC address, a source MAC address, an Ethernet type field, and a frame trailer field, the frame header field, the destination MAC address, the source MAC address, the Ethernet type field, and the frame trailer field are deleted from the frame through the MAC layer of the Ethernet ingress port, to obtain one code block stream. If any frame in the at least one frame includes only a frame header field, a destination MAC address, a source MAC address, and an Ethernet type field, the frame header field, the destination MAC address, the source MAC address, and the Ethernet type field are deleted from the frame through the MAC layer of the Ethernet ingress port, to obtain one code block stream.

Figure 11:
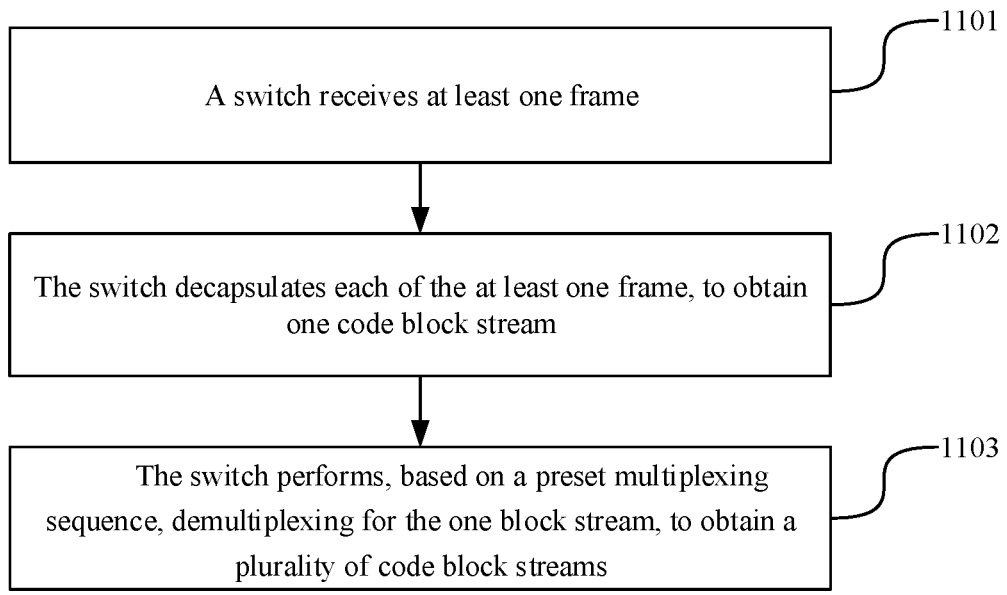
FIG. 11 is a schematic flowchart of a data transmission method according to an embodiment of the present disclosure.

As shown in FIG. 11, an example in which a switch executes a processing procedure is used for providing a detailed description of another embodiment of the present disclosure. A processing procedure of a data transmission method may include the following steps.

Step 1101. A switch receives at least one frame.

In an implementation, a virtual interleaving sub-layer is set between a MAC layer and a physical layer. After at least one frame is received through the physical layer of an Ethernet ingress port of the switch, the at least one frame is processed through the physical layer, and is transmitted to the virtual interleaving sub-layer of the Ethernet ingress port.

The virtual interleaving sub-layer is set between the MAC layer and a link control layer. After at least one frame is received through the physical layer of the Ethernet ingress port of the switch, the at least one frame is processed through the physical layer, and is transmitted to the MAC layer of the Ethernet ingress port.

Step 1102: The switch decapsulates each of the at least one frame, to obtain one code block stream.

In an implementation, the virtual interleaving sub-layer is set between the MAC layer and the physical layer. After at least one frame is received through the virtual interleaving sub-layer of the Ethernet ingress port, each of the at least one frame is decapsulated, to obtain one code block stream. This process is an inverse process of step 903 in the embodiment shown in FIG. 9.

The virtual interleaving sub-layer is set between the MAC layer and the link control layer. After at least one frame is received through the MAC layer of the Ethernet ingress port, each of the at least one frame is decapsulated, to obtain one code block stream. The one code block stream is transmitted to the virtual interleaving sub-layer of the Ethernet ingress port. This process is an inverse process of step 903 in the embodiment shown in FIG. 9.

In addition, for the decapsulation processing, refer to the description in the embodiment shown in FIG. 10.

Step 1103. The switch performs, based on a preset multiplexing sequence, demultiplexing for the one code block stream, to obtain a plurality of code block streams.

In an implementation, the virtual interleaving sub-layer is set between the MAC layer and the physical layer, or the virtual interleaving sub-layer is set between the MAC layer and the link control layer. After one code block stream is obtained through the virtual interleaving sub-layer of the Ethernet ingress port, a plurality of code blocks in a slot corresponding to a same encoding stream form a same code block stream based on a correspondence between a slot in the preset multiplexing sequence and a code block stream, and based on a slot corresponding to code blocks in one code block stream. In this way, a plurality of code block streams are obtained, and then the plurality of obtained code block streams are transmitted to a switching module in the switch through the virtual interleaving sub-layer. The switch separately transmits, by using the switching module, the plurality of obtained code block streams to corresponding Ethernet egress ports based on a correspondence between a slot of an Ethernet ingress port and a slot of an Ethernet egress port.

Alternatively, the virtual interleaving sub-layer is set between the MAC layer and the physical layer. After one code block stream is obtained through the virtual interleaving sub-layer of the Ethernet ingress port, a plurality of code blocks in a slot corresponding to a same encoding stream form a same code block stream based on a correspondence between a slot in the preset multiplexing sequence and a code block stream, and based on a slot corresponding to code blocks in one code block stream. In this way, a plurality of code block streams are obtained, and then code blocks in the plurality of obtained code block streams are decoded in a preset data decoding manner through the virtual interleaving sub-layer, to obtain a plurality service data streams. Then, the plurality of service data streams are sent to a switching module in the switch. The switch separately sends, by using the switching module, the plurality of obtained code block streams to corresponding Ethernet egress ports based on a correspondence between a slot of an Ethernet ingress port and a slot of an Ethernet egress port.

It should be noted that in the foregoing embodiments, the virtual interleaving sub-layer is set between the MAC layer and the physical layer, and the MAC layer sends the code block stream or the service data stream to the virtual interleaving sub-layer through an x media independent interface (MII). The x media independent interface is a general term for MII interfaces that are of various versions and that have various Ethernet port rates.

In the embodiments shown in FIG. 10 and FIG. 11, in an Ethernet ingress port, the virtual interleaving sub-layer is set between the MAC layer and the physical layer, or the virtual interleaving sub-layer is set between the MAC layer and the link control layer, so that the data encoding manner is irrelevant to a modulation and coding mode of the PCS at the physical layer of the Ethernet egress port.

In the embodiments of the present disclosure, the plurality of code block streams are obtained, and the code blocks in the plurality of code block streams are distributed by slots based on the preset multiplexing sequence, to form the one code block stream, and the one code block stream is segmented and encapsulated, to generate the at least one frame. In this way, when data is sent through the Ethernet egress port, the plurality of code block streams may be distributed by slots, to implement time division multiplexing. The plurality of code block streams does not affect each other during transmission, and therefore duration of waiting for transmission of the code block stream is reduced, thereby reducing a data transmission delay. This can meet a service requirement of a service with a relatively high data transmission delay in an industrial Ethernet.

Figure 12:
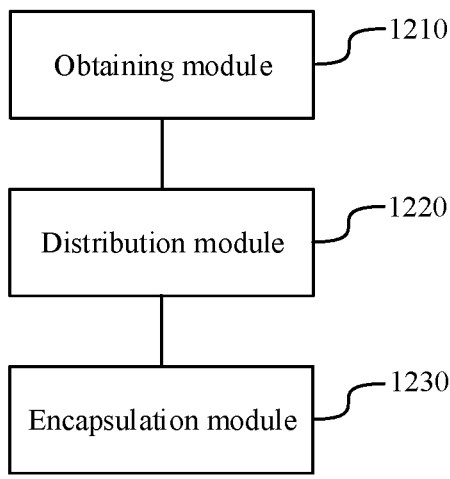
FIG. 12 is a schematic structural diagram of a data transmission apparatus according to an embodiment of the present disclosure.

FIG. 12 is a structural diagram of a data transmission apparatus according to an embodiment of the present disclosure. The apparatus may be implemented as some or all of an apparatus by using software, hardware, or a combination of software and hardware. The apparatus provided in this embodiment of the present disclosure may implement the procedures shown in FIG. 5 and FIG. 9 of the embodiments of the present disclosure. The apparatus includes: an obtaining module 1210, a distribution module 1220, and an encapsulation module 1230.

The obtaining module 1210 is configured to obtain a plurality of code block streams, and is specifically configured to implement the obtaining functions in the foregoing step 501, step 901, step 1001, and step 1101, and other implicit steps.

The distribution module 1220 is configured to distribute, based on a preset multiplexing sequence, code blocks in the plurality of code block streams by slots, to form one code block stream, and is specifically configured to implement the distribution functions in the foregoing step 502, step 902, step 1002, and step 1102, and other implicit steps.

The encapsulation module 1230 is configured to segment and encapsulate the one code block stream, to generate at least one frame, and is specifically configured to implement the encapsulation functions in the foregoing step 503, step 903, step 1003, and step 1103, and other implicit steps.

Optionally, the distribution module 1220 is configured to:

distribute, based on a correspondence between a slot in the preset multiplexing sequence and a code block stream, the code blocks in each of the plurality of code block streams to a corresponding slot, where each multiplexing sequence includes N slots, and N is a positive integer.

Optionally, the distribution module 1220 is configured to:

distribute, based on a correspondence between a slot in the preset multiplexing sequence and an obtaining interface, and based on an obtaining interface of the plurality of code block streams, the code blocks in each of the plurality of code block streams to a corresponding slot.

Optionally, the obtaining module 1210 is configured to:

receive one service data stream; and encode, in a preset data encoding manner, the one service data stream, to obtain any one of the plurality of code block streams.

Optionally, the obtaining module 1210 is configured to:

receive at least one service data stream and at least one code block stream;

encode each service data stream in a preset data encoding manner, to obtain at least one code block stream; and obtain at least one code block stream obtained by encoding and at least one received code block stream.

Optionally, the obtaining module 1210 is configured to:

receive a plurality of service data streams; and encode each service data stream in a preset data encoding manner, to obtain a plurality of code block streams.

Optionally, the obtaining module 1210 is configured to:

for each service data stream, encode the service data stream into a code block including four data fields, and set a first indication identifier for each code block of the code block, where the first indication identifier has a first state or a second state, the first state is used to indicate that all the four data fields of the code block are service data, and the second state is used to indicate that at least one of the four data fields in the code block is control data; and further set a second indication identifier of a code block whose at least one of the four data fields is the control data, and the second indication identifier is used to indicate a location of the service data and the control data in the code block.

Optionally, the preset data encoding manner is any one of 8B/9B encoding, 64B/66B encoding, and 256B/257B encoding.

Optionally, the apparatus is applied to an Ethernet egress port of a switch; and the obtaining module 1210 is configured to:

obtain a plurality of code block streams from an Ethernet ingress port of the switch; and the distribution module 1220 is configured to:

distribute, based on a correspondence between a slot of an Ethernet egress port and a slot of an Ethernet ingress port in the preset multiplexing sequence, and based on a slot of the Ethernet ingress port of the code blocks in the plurality of code block streams, code blocks in each of the plurality of obtained code block streams to a corresponding slot of the Ethernet egress port, where each multiplexing sequence includes N slots, and N is a positive integer.

Optionally, the encapsulation module 1230 is configured to:

segment and encapsulate the one code block stream based on a preset frame length, to generate the at least one frame.

Optionally, the encapsulation module 1230 is configured to:

segment the one code block stream, and insert a frame header field into each segment, to generate at least one frame; or segment the one code block stream, and insert a frame header field and a frame trailer field into each segment, to generate at least one frame.

Optionally, a frame format of a frame in the at least one frame is the frame header field, and a first preset quantity of multiplexing sequences, and each multiplexing sequence includes a second preset quantity of slots; or a frame format of a frame in the at least one frame is the frame header field, a first preset quantity of multiplexing sequences, and the frame trailer field, and each multiplexing sequence includes a second preset quantity of slots.

Optionally, the apparatus is applied to an Ethernet egress port; and the encapsulation module 1230 is configured to:

segment the one code block stream, and insert a frame header field, a destination MAC address, a source MAC address, and an Ethernet type field into each segment, to generate at least one frame, where the destination MAC address is any MAC address, and the source MAC address is a MAC address of the Ethernet egress port; or segment the one code block stream, and insert a frame header field, a destination MAC address, a source MAC address, an Ethernet type field, and a frame trailer field into each segment, to generate at least one frame, where the destination MAC address is any MAC address, and the source MAC address is a MAC address of the Ethernet egress port.

Optionally, a frame format of a frame in the at least one frame is the frame header field, the destination MAC address, the source MAC address, the Ethernet type field, and a third preset quantity of multiplexing sequences, and each multiplexing sequence includes a fourth preset quantity of slots; or a frame format of a frame in the at least one frame is the frame header field, the destination MAC address, the source MAC address, the Ethernet type field, a third preset quantity of multiplexing sequences, and the frame trailer field, and each multiplexing sequence includes a fourth preset quantity of slots.

Optionally, the frame header field is a preamble, and the frame trailer field is a cyclic redundancy check CRC field.

It should be noted that the obtaining module 1210, the distribution module 1220, and the encapsulation module 1230 may be implemented by the processor 302 or 402.

Figure 13:
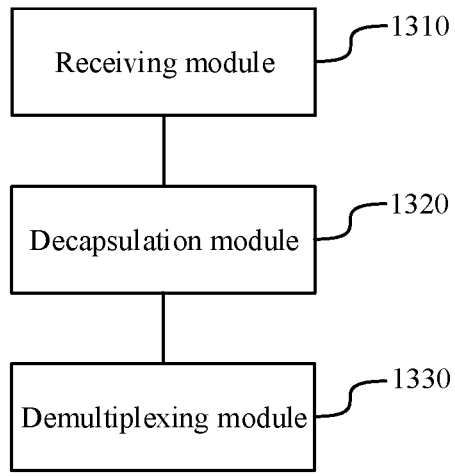
FIG. 13 is a schematic structural diagram of a data transmission apparatus according to an embodiment of the present disclosure.

FIG. 13 is a structural diagram of a data transmission apparatus according to an embodiment of the present disclosure. The apparatus may be implemented as some or all of an apparatus by using software, hardware, or a combination of software and hardware. The apparatus provided in this embodiment of the present disclosure may implement the procedures shown in FIG. 10 and FIG. 11 of the embodiments of the present disclosure. The apparatus includes: a receiving module 1310, a decapsulation module 1320, and a demultiplexing module 1330.

The receiving module 1310 is configured to receive at least one frame.

The decapsulation module 1320 is configured to decapsulate each of the at least one frame, to obtain one code block stream.

Figure 14:
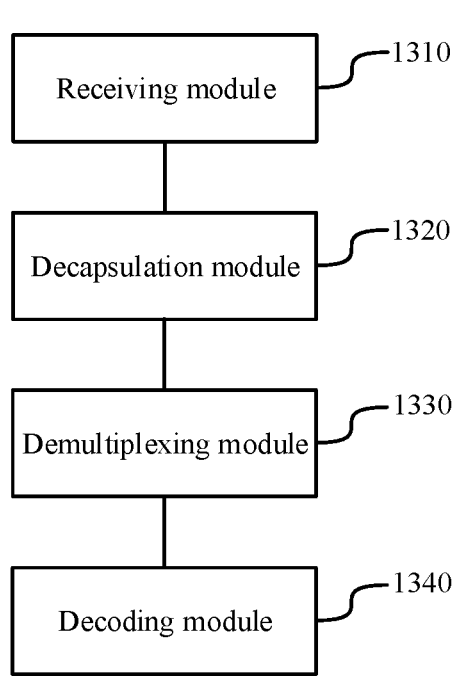
FIG. 14 is a schematic structural diagram of a data transmission apparatus according to an embodiment of the present disclosure.

The demultiplexing module 1330 is configured to perform, based on a preset multiplexing sequence, demultiplexing for the one code block stream, to obtain a plurality of code block streams Optionally, as shown in FIG. 14, the apparatus further includes:

a decoding module 1340, configured to decode each code block in the plurality of code block streams in a preset data decoding manner.

Optionally, the decapsulation module 1320 is configured to:

delete a frame header field and a frame trailer field from each of the at least one frame, to obtain one code block stream; or delete a frame header field from each of the at least one frame, to obtain one code block stream.

Optionally, the decapsulation module 1320 is configured to:

delete a frame header field, a destination MAC address, a source MAC address, an Ethernet type field, and a frame trailer field from each of the at least one frame, to obtain one code block stream; or delete a frame header field, a destination MAC address, a source MAC address, and an Ethernet type field from each of the at least one frame, to obtain one code block stream.

It should be noted that the receiving module 1310, the decapsulation module 1320, and the demultiplexing module 1330 may be implemented by the processor 302 or 402.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a host, the procedures or functions according to the embodiments of the present disclosure are all or partially generated. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, and microwave, or the like) manner. The computer readable storage medium may be any usable medium accessible by a host, or a data storage device, such as a server or a data center, integrating one or more usable media. The usable medium may be a magnetic medium (for example, a floppy disk, a hard disk, and a magnetic tape), an optical medium (for example, a digital video disc (Digital Video Disk, DVD)), or a semiconductor medium (for example, a solid-state drive).

The foregoing descriptions are merely specific implementations of various embodiments disclosed in this application, but are not intended to limit this application. Any modification, equivalent replacement, or improvement made without departing from the spirit and principle of this application should fall within the scope of this application.

What is claimed is:

1. A data transmission method, wherein the method comprises:
   obtaining code blocks in a plurality of code block streams;
   distributing, based on a correspondence between each slot in a preset multiplexing sequence that includes a plurality of slots and an obtaining interface of each code block stream in the plurality of code block streams, the code blocks in each of the plurality of code block streams to corresponding slots of the preset multiplexing sequence to form one code block stream; and
   segmenting and encapsulating the one code block stream to generate at least one frame,
   wherein the method is applied to an Ethernet egress port of a switch;
   wherein the obtaining the code blocks in the plurality of code block streams comprises:
   obtaining the code blocks in the plurality of code block streams from at least one Ethernet ingress port of the switch; and
   wherein the distributing, based on the preset multiplexing sequence, the code blocks in the plurality of code block streams to the corresponding slots comprises:
   distributing, based on a correspondence between a slot of the Ethernet egress port and a slot of an Ethernet ingress port in the preset multiplexing sequence, and based on a slot of the Ethernet ingress port of the code blocks in the plurality of code block streams, the code blocks in each of the plurality of code block streams to a corresponding slot of the Ethernet egress port.

2. The method according to claim 1, wherein the obtaining the plurality of code block streams comprises:
   receiving one service data stream; and
   encoding the one service data stream in a preset data encoding manner, to obtain any one of the plurality of code block streams.

3. The method according to claim 2, wherein the encoding the one service data stream in the preset data encoding manner comprises:
   for the one service data stream, encoding the service data stream into a code block comprising four data fields and at least one flag field, and setting a first indication identifier for each code block in a flag field of the code block, wherein the first indication identifier indicates a first state or a second state, the first state is used to indicate that each of the four data fields of the code block is used for service data, and the second state is used to indicate that at least one of the four data fields in the code block is used for control data; and further setting a second indication identifier in a flag field of a code block whose at least one of four data fields is used for control data, wherein the second indication identifier is used to indicate locations of the service data and the control data in the code block.

4. The method according to claim 1, wherein the segmenting and encapsulating the one code block stream to generate the at least one frame comprises:
   segmenting the one code block stream into a plurality of segments, and inserting a frame header field into each segment of the plurality of segments, to generate the at least one frame; or
   segmenting the one code block stream into the plurality of segments, and inserting the frame header field and a frame trailer field into each segment of the plurality of segments, to generate the at least one frame.

5. The method according to claim 4, wherein a frame format of a frame in the at least one frame is the frame header field, and a first preset quantity of multiplexing sequences, and each multiplexing sequence comprises a second preset quantity of slots; or
   a frame format of a frame in the at least one frame is the frame header field, the first preset quantity of multiplexing sequences, and the frame trailer field, and each multiplexing sequence comprises the second preset quantity of slots.

6. The method according to claim 1, wherein the method is applied to the Ethernet egress port; and
   the segmenting and encapsulating the one code block stream, to generate the at least one frame comprises:
   segmenting the one code block stream into a plurality of segments, and inserting a frame header field, a destination MAC address, a source MAC address, and an Ethernet type field into each segment of the plurality of segments, to generate the at least one frame, wherein the destination MAC address is any MAC address, the source MAC address is a MAC address of the Ethernet egress port, and the Ethernet type field is used to identify that the frame is an Ethernet type frame; or
   segmenting the one code block stream into the plurality of segments, and inserting the frame header field, the destination MAC address, the source MAC address, the Ethernet type field, and a frame trailer field into each segment of the plurality of segments, to generate the at least one frame, wherein the destination MAC address is any MAC address, the source MAC address is the MAC address of the Ethernet egress port, and the Ethernet type field is used to identify that the frame is the Ethernet type frame.

7. The method according to claim 6, wherein a frame format of a frame in the at least one frame is the frame header field, the destination MAC address, the source MAC address, the Ethernet type field, and a third preset quantity of multiplexing sequences, and each multiplexing sequence comprises a fourth preset quantity of slots; or a frame format of a frame in the at least one frame is the frame header field, the destination MAC address, the source MAC address, the Ethernet type field, a third preset quantity of multiplexing sequences, and the frame trailer field, and each multiplexing sequence comprises the fourth preset quantity of slots.

8. The method according to claim 6, wherein the frame header field is a preamble, and the frame trailer field is a cyclic redundancy check CRC field.

9. A data transmission apparatus, wherein the apparatus comprises a processor, and wherein the processor is configured to:

obtain code blocks in a plurality of code block streams;

distribute, based on a correspondence between each slot in a preset multiplexing sequence that includes a plurality of slots and an obtaining interface of each code block stream in the plurality of code block streams, the code blocks in each of the plurality of code block streams to corresponding slots of the preset multiplexing sequence to form one code block stream; and segment and encapsulate the one code block stream to generate at least one frame, wherein the apparatus comprises a switch; and wherein the processor is configured to:

obtain the code blocks in the plurality of code block streams from at least one Ethernet ingress port of the switch; and distribute, based on a correspondence between a slot of an Ethernet egress port of the switch and a slot of an Ethernet ingress port in the preset multiplexing sequence, and based on a slot of the Ethernet ingress port of the code blocks in the plurality of code block streams, the code blocks in each of the plurality of code block streams to a corresponding slot of the Ethernet egress port.

10. The apparatus according to claim 9, wherein the processor is configured to:

segment the one code block stream into a plurality of segments, and insert a frame header field into each segment of the plurality of segments, to generate at least one frame; or segment the one code block stream into the plurality of segments and insert a frame header field and a frame trailer field into each segment of the plurality of segments, to generate the at least one frame.

* * * * *